United States Patent [19]
Brunner

[11] 3,762,623
[45] Oct. 2, 1973

[54] PRESSURE WELDING APPARATUS

[75] Inventor: Hans A. Brunner, Chester, Va.

[73] Assignee: Reynolds Metals Company,
Richmond, Va.

[22] Filed: Apr. 10, 1972

[21] Appl. No.: 242,427

[52] U.S. Cl. ............... 228/3, 29/203 R, 29/470.1,
29/605, 156/446, 156/511, 228/4, 228/44
[51] Int. Cl. ............................................. B23k 21/00
[58] Field of Search ............... 29/203 R, 605, 470.1;
156/511, 516, 446, 468; 113/119; 242/56.1;
228/3, 4, 5, 44

[56] References Cited
UNITED STATES PATENTS

| | | | |
|---|---|---|---|
| 2,883,893 | 4/1959 | Bloxham et al. | 228/3 |
| 3,190,525 | 6/1965 | Foley et al. | 228/5 |
| 3,336,655 | 8/1967 | Raymas | 228/3 X |
| 3,559,909 | 2/1971 | Whiteman | 242/56.1 |
| 3,600,794 | 8/1971 | Shibata et al. | 29/470.1 |

*Primary Examiner*—J. Spencer Overholser
*Assistant Examiner*—Robert J. Craig
*Attorney*—John F. C. Glenn et al.

[57] ABSTRACT

An apparatus for cold welding at least one electrical lead on a strip of electrically conductive material which is adapted to be wound in coil form to make a strip conductor coil. The apparatus has a pair of cooperating dies and a pneumatically actuated cam system for urging one of the dies toward the other die to thereby cold or pressure weld the lead against the strip upon interposing the lead and strip between the cooperating dies.

16 Claims, 5 Drawing Figures

PATENTED OCT 2 1973 3,762,623
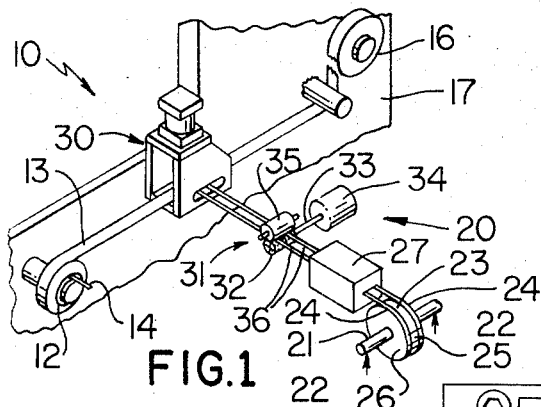
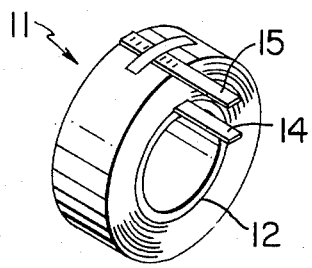
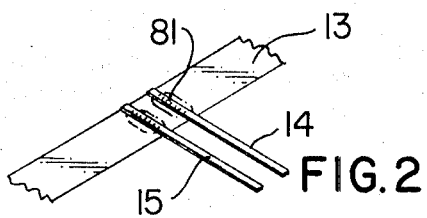
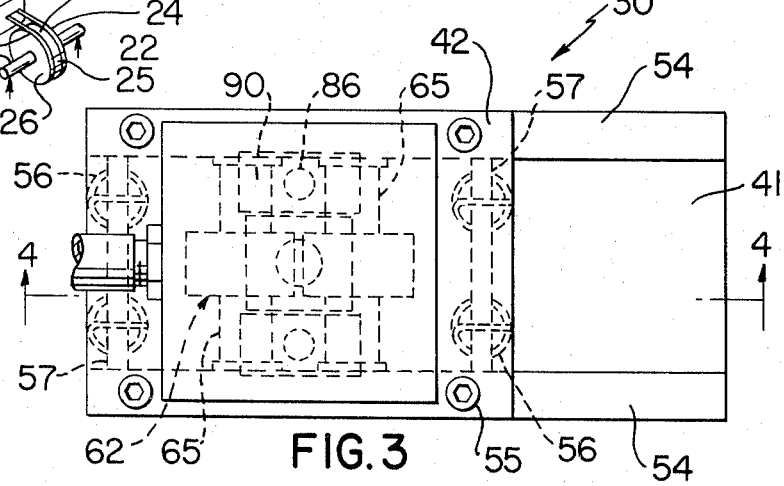
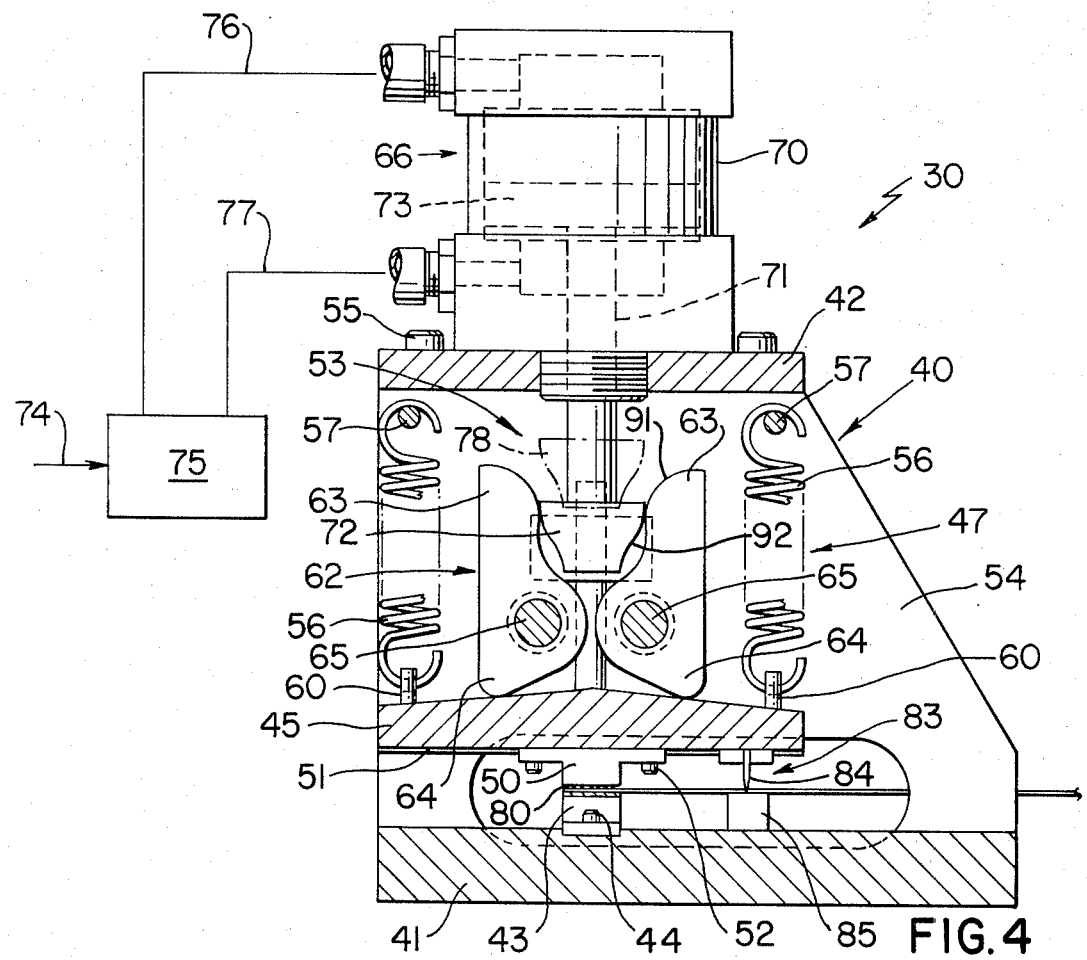

PRESSURE WELDING APPARATUS

BACKGROUND OF THE INVENTION

Apparatus or machines have been proposed heretofore for winding a strip of electrically conductive material (such as metallic foil) in coil form to define an electrical strip conductor coil, and a typical machine of this type is disclosed in U.S. Pat. No. 3,559,909, for example. Because of the comparatively small thickness of the strip of metallic foil used to make such a strip conductor coil, great care must be exercised in attaching the necessary electrical leads on such a coil to assure both a high-strength mechanical and electrical connection.

The devices proposed heretofore for attaching such leads in position have been generally unsatisfactory because they have either been comparatively complicated and expensive to construct and operate or they have provided unsatisfactory connections.

SUMMARY

This invention provides an improved apparatus of simple and economical construction for fixing at least one lead on a strip of electrically conductive material which is adapted to be wound in coil form to make a strip conductor coil. The apparatus employs a die which is supported at a fixed position and a movable die which is yieldingly held in spaced relation from the fixed die, and the movable die is moved by a simple and unique pneumatically actuated cam system which moves the movable die toward the fixed die with optimum efficiency to pressure weld the lead against the strip upon interposing the lead and strip between the dies and thereby provide a high-strength mechanical and electrical connection.

Other details, uses, and advantages of this invention will become apparent as the following description of the exemplary embodiments thereof presented in the accompanying drawing proceeds.

BRIEF DESCRIPTION OF THE DRAWING

The accompanying drawing shows a present preferred embodiment of this invention, in which FIG. 1 is a fragmentary view, with certain parts shown schematically and others represented by arrows, of a portion of a strip conductor coil winding machine which employs one embodiment of the apparatus of this invention;

FIG. 1A is a perspective view of a strip conductor coil made using the machine of FIG. 1;

FIG. 2 is a fragmentary perspective view illustrating a pair of leads attached by the apparatus of this invention in side-by-side relation against a strip conductor;

FIG. 3 is a top view of the lead attaching apparatus of this invention with certain parts shown by dotted lines; and FIG. 4 is a view taken essentially on the line 4—4 of FIG. 3 and also schematically illustrating a portion of an air conduit system which is operatively connected to an air cylinder comprising such lead attaching apparatus.

DESCRIPTION OF ILLUSTRATED EMBODIMENT

Reference is now made to FIG. 1 of the drawing which illustrates a fragmentary portion of a machine for winding strip conductor coils and such machine is designated generally by the reference numeral 10. The machine 10 may be of any suitable construction known in the art and a typical machine is disclosed in the above-mentioned U.S. Pat. No. 3,559,909 and reference may be made to such patent for a detailed understanding of the construction and operation of such a machine. However, such detailed understanding is not necessary for an understanding of this invention which is only concerned with an improved apparatus for fixing one or more leads on a strip of electrically conductive material used to make a strip conductor coil and as will be described in detail subsequently.

The machine 10 is used to make strip conductor coils such as the exemplary coil 11, see FIG. 1A, which is comprised of a tubular right-circular cylindrical core element 12 made of a suitable material such as cardboard, for example, and the core 12 has a ribbon or strip 13 of electrically conductive material, such as aluminum foil, for example, wound thereon. The strip 13 has an electrical lead 14 fixed to its inner end portion and an electrical lead 15 fixed to its outer end portion and the completed coil 11 is adapted to be installed in an associated electrical system with its leads 14 and 15 suitably electrically connected in a known manner.

The elongated strip of conductive material 13 is wound on a supply roll 16 thereof which is suitably mounted on a frame 17 of the machine 10 for unwinding rotation and the strip 13 preferably has a strip or coating of electrically insulating material prelaminated or applied against the under side thereof before such strip is wound on the core 12 to define the coil 11. The insulating material electrically insulates adjacent coils or turns of the strip of conductive material 13 in a known manner and it will be appreciated that the strip may also be wound on the core 12 with a separate strip of insulating material so that the strip of insulating material is interleaved between adjacent coils of the strip of conductive material 13 to electrically insulate adjacent turns of the strip 13 from each other. However, regardless of whether the strip 13 has insulating material prelaminated thereagainst or has insulating material interleaved in the manner mentioned above, this invention provides an improved apparatus for fixing the leads 14 and 15 in position against the strip 13 by a cold welding or pressure welding action and such apparatus is designated generally by the reference numeral 20.

As seen particularly in FIG. 1 of the drawing, the apparatus 20 includes a shaft 21 which is suitably supported on a pair of supports designated schematically by arrows 22 and the shaft 21 supports a supply roll 23 which has two coils of lead material 24 coiled thereon with a predetermined spacing therebetween as provided by a central spacer plate 25. A pair of end plates 26 are also provided and such end plates cooperate with the spacer plate to define a pair of narrow spools which laterally support the two coils of lead material and enable such material to be unwound with optimum efficiency.

The apparatus 20 has a lead advancing mechanism 27 which is particularly adapted to unwind and advance the lead material 24 so that rectilinear lengths thereof are suitably positioned within a pressure or cold welding apparatus or device 30 which comprises the overall apparatus 20. Although any suitable mechanism capable of grasping and simultaneously advancing two lengths of lead material may be employed, in one application of this invention a lead advancing mechanism manufactured by Mechanical Tool and Engineering Company, 4701 Kiswaukee St., Rockford, Ill., 61101, and sold under the trade name "Rapidair Model A2" was used successfully.

The apparatus 20 also includes a device 31 for mechanically cleaning the surface of the lead material 24 which is to be brought into contact with the strip 13. The device 31 comprises a wire brush assembly 32 which is fixed on an associated shaft 33 which is driven by an electric motor 34 and the device 31 may employ a suitable backup roll 35 which engages the top surfaces of the lead material to prevent upward deflection thereof during cleaning by brush assembly 32. The cleaning device 31 cleans the bottom surfaces 36 of the lead material 24 so that a freshly cleaned surface which is free of oxidation is provided and brought into immediate contact with the top surface of the strip 13 to enable cold or pressure welding of the lead material 24 against strip 13 with optimum efficiency.

The pressure welding apparatus or device 30 assures the application of substantial forces due to the unique construction of its cam means yet such device may be actuated using a conventional comparatively low pressure actuating device and as will be apparent from the following description. In particular, the apparatus 30 comprises a supporting structure designated generally by the reference numeral 40 (see FIG. 4) having a bottom support in the form of a supporting plate 41 and a top support or plate 42. A bottom die 43 is provided and fixed to the bottom plate 41 by and bolts 44 and the apparatus 30 has a die plate 45 which is yieldingly suspended from the top support or plate 42 by suitable suspending means designated generally by the reference numeral 47. The die plate has a top die 50 suitably fixed to its bottom surface 51 by a plurality of threaded bolts 52 and cam means or a cam system 53 is provided for engaging the die plate 45 and moving such plate and the top die 50 toward the bottom die 43 to thereby pressure weld the leads 24 against the strip 13 upon interposing the leads and strip between the dies 43 and 50 utilizing the lead advancing mechanism 27.

The supporting structure 40 comprises a pair of spaced vertical plates 54 arranged in parallel relation and fixed in position between the plates 41 and 42 using suitable fastening means such as the threaded bolts 55, for example, which connect the top plate 42 and plates 54. Further, the suspending means 47 for the die plate 45 comprises a plurality of coiled tension springs 56 each having a top portion fastened over an associated rod 57 which is fixed between the vertical plates 54. Each spring 56 has a lower portion suitably fastened in an upwardly extending member 60 which is fixed to the die plate 45 whereby the springs 56 yieldingly suspend the die plate 45 and top die 50 above the bottom die 43 and in spaced relation therefrom.

The cam means or system 53 of apparatus 30 is a pneumatically actuated cam system 53 and comprises a pair of cams 62 each having an upper portion 63 and a lower portion 64. The cams 62 are supported for pivoting movements by a pair of pivot pins 65 which are arranged in parallel relation and supported in a fixed manner between vertical plates 54. A pneumatic actuator 66 is provided for engaging the upper portions 63 of the cams 62 causing pivoting thereof about the pins 65 and causing the lower portions 64 to override the action of the tension springs 56 and urge the die plate 45 and hence the top die 50 toward the bottom die 43.

The pneumatic actuator comprises an air cylinder 70 having a piston rod 71 which is provided with a cam actuating member 72 at its terminal outer end and the cam actuating member is adapted to engage the upper portions 63 of the cams 62 upon actuating the air cylinder. The air cylinder 70 also has a piston 73 suitably slidably supported therewithin and the rod 71 is fixed to the piston 73 in a known manner. The air cylinder 70 is actuated in a known manner by supplying air under regulated pressure through a conduit 74 from a suitable source. A selector valve 75 is connected to the downstream end of conduit 74 and if it is desired to pressure weld leads which have been advanced within apparatus 30 the valve 75 is actuated in one direction so that air flow is provided through conduit 76 to the top portion of the air cylinder 70 and to the top surface of piston 73 causing rod 71 to be extended outwardly and causing cam actuating member 72 to be urged against cams 62 whereby the dies 50 and 43 operate against the leads and strip 13 to provide the pressure welding action. The cylinder 70 is retracted after pressure welding of the leads simply by actuating selector valve 75 in a reverse direction to thereby provide air flow through a conduit 77 to the under side of the piston 73 causing retraction of the piston within its cylinder and causing the cam actuating member 72 to be moved upwardly to the dotted line position illustrated at 78 in FIG. 4 whereby the springs 56 raise the plate 45 and die 50 away from the strip 13 and the now welded leads.

To increase the loading per unit area and thereby assure pressure welding by the dies 50 and 43 with optimum efficiency at least one of the dies, shown as the top die 50, has a plurality of parallel projections 80 extending outwardly therefrom and such projections are adapted to engage the lead material 24 and provide indentations therein as illustrated at 81 in FIG. 1 and a corresponding substantial pressure to provide the desired cold or pressure welding.

The apparatus 20 has a cutting device or cutter 83 which in this example is provided as an integral part of the pressure welding apparatus 30. The cutter 83 comprises a cutting blade 84 which is detachably fixed to the die plate 45 and a back-up plate 85 which is detachably fixed to the bottom support 41. Thus, it is seen that once the air cylinder 70 is actuated not only is the pressure welding action provided by the cooperating action of the dies 50 and 43 but the cutting blade 84 is urged against the lead material 24 and cooperates with the back-up plate 85 to sever such lead material to define outer lead 15 of one coil 11 being completed and inner lead 14 of a coil 11 to be wound.

The pressure welding apparatus 30 provides optimum welding action nd the unique cam system 53 assures the provision of a mechanical advantage in excess of 20 to 1 in a compact volume and in one application a mechanical advantage of roughly 24 to 1 was provided. With this high mechanical advantage it is possible with a 4 inch bore cylinder and 100 psig air pressure to exert roughly fifteen tons of total pressure whereby a commercially available air cylinder may be utilized to provide the pressure welding action. It will also be appreciated that by using air as the operating medium expenses for the operating fluid are eliminated and any leakage is not detrimental to the coil winding operation.

The apparatus 30 has guide means for guiding the die plate 45 and hence the die 50 for precision rectilinear vertical movements toward and away from the die 43. In this example such guide means comprises a pair of vertical rods 86 having their lower ends fixed to the die plate 45 and such rods are slidably received through a pair of support blocks 90 which are fixed to the vertical plates 54.

It will also be noted that the upper portion 63 of each cam has an arcuate surface 91 and the member 72 has a cooperating inverted bell-shaped surface 92. The bell-shaped surface 92 is adapted to engage arcuate surfaces 91 to provide pivoting movements in a smooth gradual manner.

The pressure welding apparatus 30 with its suspended die plate 45 and unique cam system 53 has been used successfully to pressure weld copper leads to a strip of aluminum foil to make a strip conductor coil 11; however, it will be appreciated that this unique cam system and die plate arrangement may be used to pressure weld other materials and may be used in stamping operations or similar operations, if desired.

While present exemplary embodiments of this invention, and methods of practicing the same, have been illustrated and described, it will be recognized that this invention may be otherwise variously embodied and practiced within the scope of the following claims.

What is claimed is:

1. An apparatus for fixing at least one lead on a strip of electrically conductive material which is adapted to be wound in coil form to make a strip conductor coil, said apparatus comprising, a first die supported at a fixed position, a second die attached to a die plate, means yieldingly holding said die plate and said second die spaced from said first die, and cam means for engaging said die plate and moving said die plate and second die toward said first die while providing a substantial mechanical advantage which assures pressure welding of said lead against said strip upon interposing said lead and strip between said dies, said cam means comprising a supporting structure, a pair of cams each having an upper and a lower portion, and a pair of pivot pins each supporting an associated cam between its upper and lower portions for pivoting movements, and said apparatus further comprising a pneumatic actuator for engaging the upper portions of said cams causing pivoting thereof about said pins and causing said lower portions to urge said die plate and said second die toward said first die.

2. An apparatus as set forth in claim 1 in which one of said dies has a plurality of parallel projections provided therein, said projections serving to decrease the effective contact area of said one die so that with said actuator applying a given force the load per unit area exerted by said projections assures said pressure welding is achieved with optimum efficiency.

3. An apparatus as set forth in claim 1 in which said pneumatic actuator comprises an air cylinder having a piston rod and a cam actuating member attached to the terminal outer end of said rod, said cam actuating member being adapted to engage said upper portions of said cams upon actuating said air cylinder.

4. An apparatus as set forth in claim 1 and further comprising a device for mechanically cleaning that surface of said lead which is to be brought into contact with said strip.

5. An apparatus as set forth in claim 1 and further comprising a shaft supporting a supply roll of lead material for unwinding rotation, a device for unwinding a predetermined length of said lead material from said supply roll and moving it in aligned relation between one of said dies and said strip, and a cutter operated by said pneumatic actuator for cutting said lead material to define said lead simultaneously with the pressure welding thereof against said strip.

6. An apparatus as set forth in claim 1 and further comprising guide means guiding said die plate and hence said second die for movement toward and away from said first die.

7. An apparatus for pressure welding a pair of leads on a strip of electrically conductive material which is adapted to be wound in coil form, one of said leads forming the outer lead of one strip conductor coil made from said strip and the other of said leads forming the inner lead of another strip conductor coil made from said strip, said apparatus comprising, a supporting structure having a bottom support and a top support, a bottom die fixed on said bottom support, a die plate, a top die attached to the bottom surface of said die plate, means yieldingly suspending said die plate and said top die from said top support and in spaced relation from said bottom die, a pair of cams pivotally supported on said supporting structure, said cams being adapted to engage said die plate and move said die plate and top die toward said bottom die while providing a substantial mechanical advantage which assures pressure welding of said leads against said strip upon interposing said leads and strip between said dies.

8. An apparatus as set forth in claim 7 in which said means yieldingly suspending said die plate comprises a plurality of mechanical springs each having its top end portion attached to said top support and its bottom end portion attached to said die plate.

9. An apparatus as set forth in claim 8 in which said mechanical springs comprise a plurality of coiled tension springs.

10. An apparatus as set forth in claim 8 in which said supporting structure comprises a pair of spaced vertical plates arranged in parallel relation and fixed in position between said bottom and top supports with each of said cams having an upper and a lower portion and said apparatus further comprising a pair of pivot pins having opposed end portions supported by said vertical plates and each pin supporting an associated cam for pivoting movements, and a pneumatic actuator for engaging the upper portions of said cams causing pivoting thereof about said pins and causing said lower portions to urge said die plate and said top die toward said bottom die.

11. An apparatus as set forth in claim 10 in which said pneumatic actuator comprises an air cylinder having a piston rod and a cam actuating member attached to the terminal outer end of said rod, said cam actuating member being adapted to engage said upper portions of said cams upon actuating said air cylinder.

12. An apparatus as set forth in claim 11 in which the upper portion of each cam has an arcuate surface and said cam actuating member has an inverted bell-shaped surface, said bell-shaped surface being adapted to engage said arcuate surfaces to provide said pivoting movements in a gradual manner.

13. An apparatus as set forth in claim 10 and further comprising a shaft supporting a supply roll of lead material for unwinding rotation, a device for unwinding a predetermined length of said lead material from said supply roll qnd moving it in aligned relation between one of said dies and said strip, and a cutter operated by said pneumatic actuator for cutting said lead material to define said leads simultaneously with the pressure welding thereof against said strip.

14. An apparatus as set forth in claim 10 and further comprising guide means guiding said die plate and hence said top die for movement toward and away from said bottom die.

15. An apparatus as set forth in claim 14 in which said guide means comprises a pair of rods fixed to said die plate and a pair of support blocks fixed to said vertical plates and supporting said rods for vertical sliding movements.

16. An apparatus as set forth in claim 10 and further comprising a wire brush assembly for cleaning that surface of said leads which is to be brought into contact with said strip.

* * * * *